US011106621B2

(12) United States Patent
Tran (10) Patent No.: US 11,106,621 B2
(45) Date of Patent: Aug. 31, 2021

(54) ADAPTIVE SYNCHING

(71) Applicant: Intel Corporation, Santa Clara, CA (US)

(72) Inventor: Dzung D Tran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 274 days.

(21) Appl. No.: 16/305,636

(22) PCT Filed: Jul. 1, 2016

(86) PCT No.: PCT/US2016/040646
§ 371 (c)(1),
(2) Date: Nov. 29, 2018

(87) PCT Pub. No.: WO2018/004644
PCT Pub. Date: Jan. 4, 2018

(65) Prior Publication Data
US 2020/0334194 A1    Oct. 22, 2020

(51) Int. Cl.
*G06F 15/16* (2006.01)
*G06F 16/178* (2019.01)
*G06F 16/27* (2019.01)

(52) U.S. Cl.
CPC ............ *G06F 15/16* (2013.01); *G06F 16/178* (2019.01); *G06F 16/27* (2019.01)

(58) Field of Classification Search
CPC . G06F 9/52; G06F 15/16; G06F 16/00; G06F 16/27; G06F 16/178; G06F 16/182; G06F 16/1844
See application file for complete search history.

(56) References Cited

U.S. PATENT DOCUMENTS 6,385,724 B1 *  5/2002  Beckman ............... G06F 21/629
                                                      380/247
6,578,054 B1 *  6/2003  Hopmann ............ G06Q 10/107
                                                      707/625
(Continued)

FOREIGN PATENT DOCUMENTS

EP          2759933 A1 *  7/2014  ........... G06F 9/4856
WO    WO-2018004644 A1    1/2018

OTHER PUBLICATIONS

"International Application Serial No. PCT/US2016/040646, International Search Report dated Mar. 30, 2017", 3 pgs.
(Continued)

*Primary Examiner* — Kostas J Katsikis
(74) *Attorney, Agent, or Firm* — Schwegman Lundberg & Woessner, P.A.

(57) ABSTRACT

Various systems and methods for implementing adaptive synching are provided herein. A synchronization system comprises a processor; and a memory including instructions, which when executed by the processor, cause the processor to implement: a file synchronization controller to receive an indication from a client device that the client device wants to synchronize files with a file server; a policy manager to: obtain a server-side policy associated with the file server; and determine whether the file server is in a state compliant with the server-side policy; wherein the file synchronization controller is to initiate synchronization between the client device and the file server when the file server is in the state compliant with the server-side policy.

21 Claims, 7 Drawing Sheets

(56) References Cited

U.S. PATENT DOCUMENTS

| | | | |
|---|---|---|---|
| 7,062,515 B1* | 6/2006 | Thomas | G06F 12/0804 |
| | | | 711/118 |
| 7,788,382 B1 | 8/2010 | Jones et al. | |
| 9,015,248 B2 | 4/2015 | Barreto et al. | |
| 9,131,010 B2 | 9/2015 | Agrawal et al. | |
| 9,367,549 B2* | 6/2016 | Hrebicek | G06F 21/6218 |
| 9,965,489 B2* | 5/2018 | Chan | H04L 63/0853 |
| 10,055,423 B2* | 8/2018 | Sagar | H04L 67/2823 |
| 10,223,373 B2* | 3/2019 | Kadoda | G06F 16/1787 |
| 10,609,138 B2* | 3/2020 | Patel | H04L 67/1095 |
| 10,776,219 B2* | 9/2020 | Kochunni | G06F 11/1435 |
| 10,776,329 B2* | 9/2020 | Ramohalli Gopala Rao | |
| | | | G06F 9/45558 |
| 2002/0049579 A1* | 4/2002 | Gates | G06F 16/27 |
| | | | 704/1 |
| 2009/0248693 A1* | 10/2009 | Sagar | G06F 16/00 |
| 2009/0282125 A1* | 11/2009 | Jeide | H04L 67/1095 |
| | | | 709/217 |
| 2009/0282169 A1* | 11/2009 | Kumar | H04L 67/1095 |
| | | | 709/248 |
| 2010/0262958 A1 | 10/2010 | Clinton et al. | |
| 2012/0215739 A1 | 8/2012 | Chellappa et al. | |
| 2012/0233294 A1 | 9/2012 | Bhatti et al. | |
| 2013/0166507 A1* | 6/2013 | Staczek | G06F 9/542 |
| | | | 707/625 |
| 2013/0170348 A1* | 7/2013 | Luna | H04W 28/0215 |
| | | | 370/230.1 |
| 2013/0212067 A1* | 8/2013 | Piasecki | G06F 16/1787 |
| | | | 707/620 |
| 2013/0226876 A1* | 8/2013 | Gati | G06F 16/119 |
| | | | 707/652 |
| 2013/0262386 A1* | 10/2013 | Kottomtharayil | G06F 16/178 |
| | | | 707/635 |
| 2014/0173130 A1 | 6/2014 | Uluderya et al. | |
| 2014/0188804 A1* | 7/2014 | Gokhale | G06F 21/6218 |
| | | | 707/645 |
| 2014/0201145 A1* | 7/2014 | Dorman | G06F 16/27 |
| | | | 707/634 |
| 2014/0289189 A1* | 9/2014 | Chan | G06F 11/1464 |
| | | | 707/610 |
| 2014/0289196 A1* | 9/2014 | Chan | G06F 16/178 |
| | | | 707/626 |
| 2014/0289225 A1* | 9/2014 | Chan | H04L 67/1095 |
| | | | 707/722 |
| 2014/0372382 A1* | 12/2014 | Hrebicek | G06F 16/122 |
| | | | 707/662 |
| 2015/0215399 A1* | 7/2015 | Oh | G06F 16/178 |
| | | | 709/219 |
| 2015/0278245 A1* | 10/2015 | Sagar | G06F 16/9574 |
| | | | 707/610 |
| 2016/0162370 A1* | 6/2016 | Mehta | G06F 16/1451 |
| | | | 707/610 |
| 2016/0182626 A1* | 6/2016 | Endahl | H04L 67/1063 |
| | | | 709/203 |
| 2016/0196324 A1* | 7/2016 | Haviv | G06F 16/27 |
| | | | 707/626 |
| 2016/0259810 A1* | 9/2016 | Troutman | H04L 67/34 |
| 2017/0078383 A1* | 3/2017 | Murstein | G06F 16/1873 |
| 2017/0161296 A1* | 6/2017 | Ritter | G06F 16/11 |
| 2017/0331880 A1* | 11/2017 | Crofton | H04L 67/1095 |
| 2017/0331893 A1* | 11/2017 | Crofton | H04L 67/1095 |
| 2018/0150475 A1* | 5/2018 | Hrebicek | G06F 16/178 |
| 2019/0171615 A1* | 6/2019 | Tamura | G06F 16/1727 |
| 2020/0334194 A1* | 10/2020 | Tran | G06F 16/27 |

OTHER PUBLICATIONS

"International Application Serial No. PCT/US2016/040646, Written Opinion dated Mar. 30, 2018", 7 pgs.

Verdnik, Klemen, "How we leverage iOS push notifications", Layer, (Dec. 19, 2013), 13 pgs.

* cited by examiner

ADAPTIVE SYNCHING

CLAIM OF PRIORITY

This application is a U.S. National Stage Filing under 35 U.S.C. 371 from International Application No. PCT/US2016/040646, filed on Jul. 1, 2016, and published as WO 2018/004644, which application is incorporated herein by reference in its entirety.

TECHNICAL FIELD

Embodiments described herein generally relate to networking and in particular, to using adaptive synching.

BACKGROUND

File synchronization (sync, synch, or synching) is a process of ensuring that computer files in different places are updated according to various policies. File synching may be used to ensure that clients are all provided the same files from a server. A conventional use of this type is to update clients with operating system files. This type of file synchronization is referred to as "one-way file synchronization" because no files are copied back from the clients to the server. Two-way file synchronization may be used where files on the client and the server are to be maintained in a relatively identical state.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Conventionally, a client fetches data from a server (e.g., cloud) based on client-side policies. An example policy is to fetch data when the client is on a Wi-Fi connection and to not fetch data when the client is on a cellular connection. Such a policy is designed to reduce the cost to the owner of the client, which may be caused by data usage over cellular. In some cases, a heavy load is placed on the server when many clients are synching at the same time.

Disclosed herein are systems and methods that provide an adaptive file synchronization process. In general, using a server-initiated synching process, the server is able to load balance and manage the incoming sync requests from various clients. This mechanism allows the server/cloud to determine when it is best to sync with the clients based on its policies and clients' policies. This allows the server/cloud to be more efficient on spreading the sync processes and use fewer resources (e.g., processing or bandwidth) during synching cycles. The cloud is able to determine when clients may be synched and notify these clients to sync at certain time. A conventional load balancer may still be used, however the server capabilities may be more manageable and deterministic when used with the adaptive synching described herein.

Figure 1:
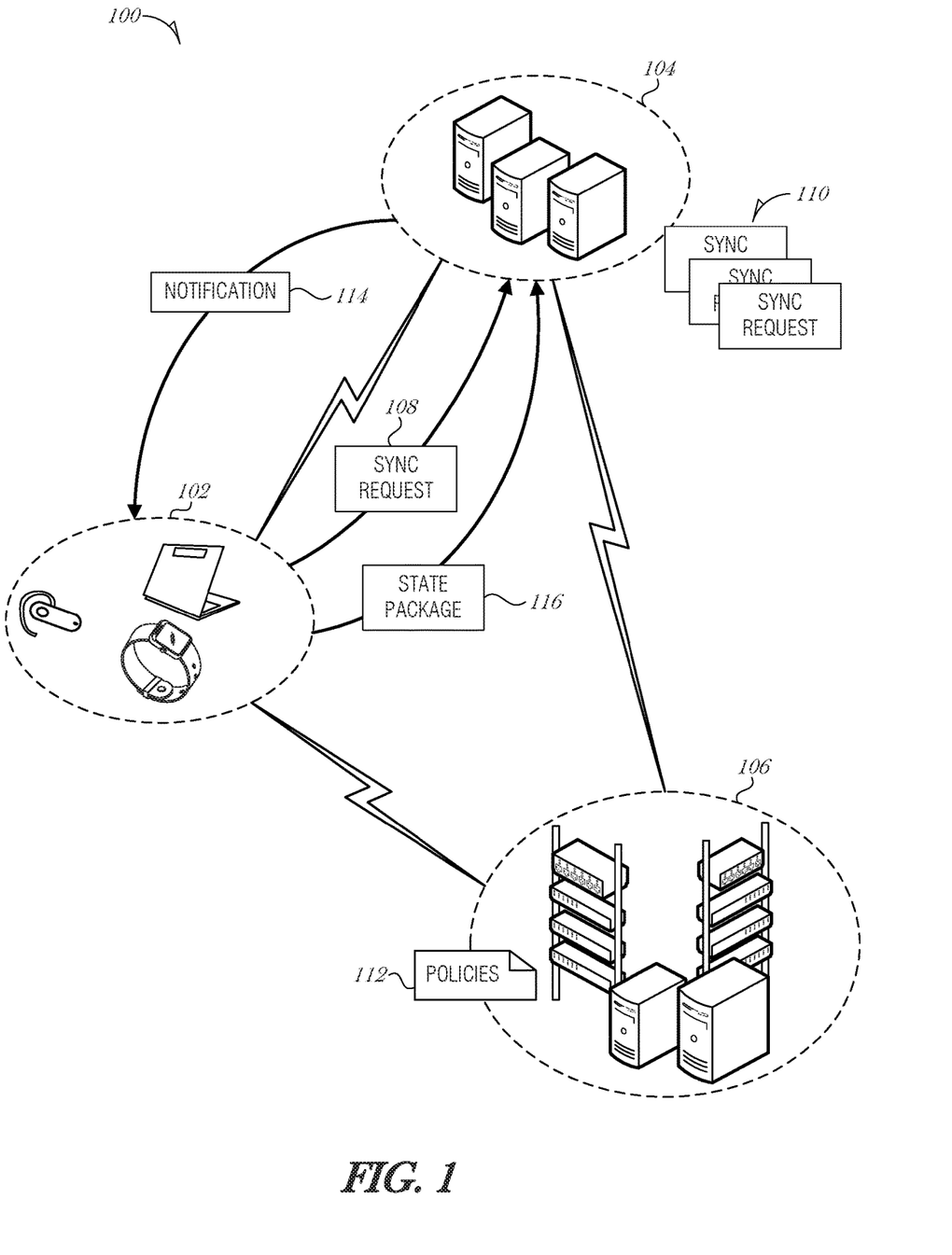
FIG. 1 is a schematic diagram illustrating an operating environment, according to an embodiment.

FIG. 1 is a schematic diagram illustrating an operating environment 100, according to an embodiment. The operating environment 100 includes a user device 102, a synchronization server 104, and a file server 106. The user device 102 may be any type of compute device including, but not limited to a smartphone, a laptop, a hybrid computer, a tablet, a phablet, a smartwatch, or other similar suitable devices that allow a user to initiate connection with the synchronization server 104 or file server 106. The synchronization server 104 and file server 106 may be incorporated into the same server system, or may be separate systems.

In a first embodiment, the user device 102 initiates a file sync with the file server 106 via the synchronization server 104. The user device 102 may not even be aware of the synchronization server 104 and its involvement. The user device 102 may observe a client-side policy, such as to only initiate a sync when connected to a Wi-Fi connection. Based on the policy, the user device 102 may transmit a sync request package 108 to the synchronization server 104. The sync request package 108 may be for a one-way or two-way file sync and include details to conduct either type of sync.

The sync request package 108 may be analyzed by the synchronization server 104 and queued in a sync queue 110. Based on server-side policies 112, which may define limits on when sync operations are available, (e.g., the number of current server instances, current server load, available bandwidth, accumulated usage, and the like), the synchronization server 104 may determine which client sync request package 108 will next be serviced. For example, the synchronization server 104 may delay a sync request package 108 that is requesting a large amount of data and serve a sync request package 108 that is requesting less data, even though the request for the large amount of data was received first. The server-side policies 112 may be obtained from the file server 106 by the synchronization server 104. In this way, the synchronization server 104 may act as a load balancing and synchronization manager for several file servers. Alternatively, the synchronization server 104 may query the file server 106 regularly or periodically for the policy package 112.

After determining the sync request package 108 to serve next, the synchronization server 104 notifies the user device 102 associated with the sync request package 108 that the sync process will begin with notification 114. Depending on the type of sync process, files may be transferred to and/or from the file server 106. The synchronization server 104 may use a notification mechanism, such as Google Cloud Messaging (GCM), Apple Push Notification Service (APNS), MQ Telemetry Transport (MQTT), or the like.

Upon receiving the notification, the user device 102 may re-check whether any client-side policies are still satisfied, and if so, establish a connection with the file server 106 to perform the sync.

In a second embodiment, the synchronization server 104 or file server 106 is used to initiate the sync. The user device 102 may initially transmit a policy package 112 to the synchronization server 104. The policy package 112 includes details of what state is required for the user device 102 in order for the user device 102 to initiate a sync. States include, but are not limited to, the type of network connection, the data throughput of the network connection, the power source being used, the time of day, the current processor load on the user device 102, and the like. For example, the user device 102 may be restricted to sync only when on mains power (e.g., plugged into an outlet), after midnight, and when connected to a Wi-Fi connection.

The synchronization server 104 may log the policy package 112 and then set up a polling process to monitor the user device 102. The polling process may query the user device 102 for its state on a regular or periodic basis (e.g., every minute, every five minutes, etc.). In response to the query, the user device 102 may provide a state package 116 to the synchronization server 104. Alternatively, the user device 102 may regularly or periodically transmit a state package 116 to the synchronization server 104.

Based on the state package 116, the synchronization server 104 is able to determine when the user device 102 is permitted to sync in view of the client-side policies logged form the policy package 112. Upon making a determination that the client-side policies are in line with the current state of the user device 102, the synchronization server 104 may queue a sync request 108 in the sync queue 110.

After being queued, the sync request 108 is treated similar to that described above in the discussion of the first embodiment. In particular, the sync request 108 is analyzed with respect to the server-side policies, and when appropriate, the synchronization server 104 initiates a notification to the user device 102, such as by using GCM, APNS, MQTT, or other suitable notification mechanisms.

Figure 2:
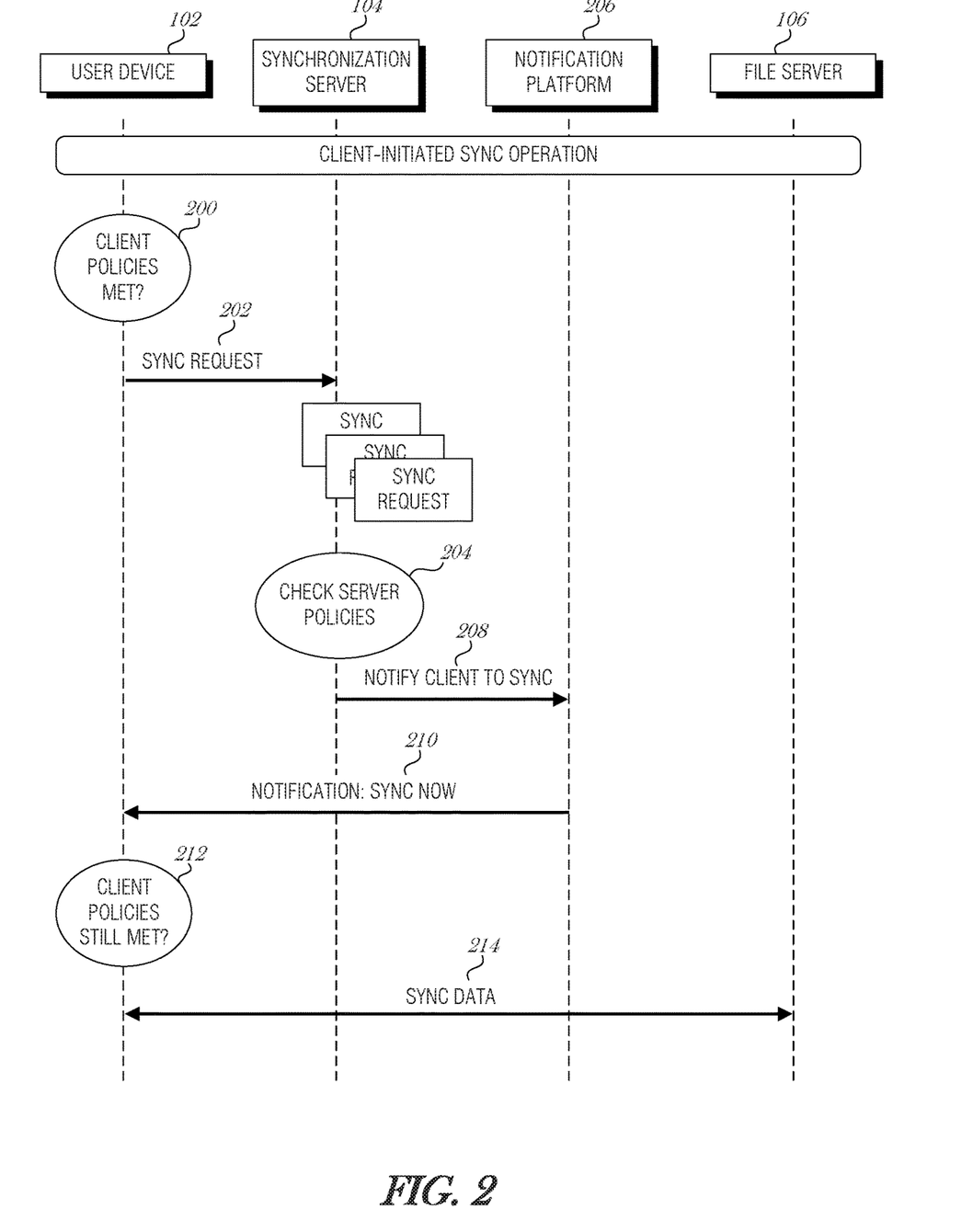
FIG. 2 is a swim lane diagram illustrating message traffic between the user device, synchronization server, and file server, according to an embodiment.

FIG. 2 is a swim lane diagram illustrating message traffic between the user device 102, synchronization server 104, notification platform 206, and file server 106, according to an embodiment. At 200, the user device 102 determines whether the client-side policies are met. Example client-side policies include, but are not limited to, whether the user device 102 is connected to a certain type of network, whether the user device 102 is plugged into a power source, whether the user device 102 has a full or nearly full battery, and other aspects of the state of the user device 102 or the state of the operating environment of the user device 102.

When the correct conditions are detected, the user device 102 may transmit a sync request 202 to the synchronization server 104. The synchronization server 104 queues the sync request 202.

The synchronization server 104 then determines whether the server-side policies are met (operation 204). Example server-side policies include, but are not limited to whether the file server 106 has enough network capacity to serve the sync request 202, whether the file server 106 has more than a threshold number of instances of virtualized servers instantiated, whether the file server 106 has enough data capacity, and the like.

The server policy check may run substantially continuously or periodically, such as every five minutes. A timeout may be used such that if the server does not become available to service a pending sync request 202 in a threshold period of time, then the sync request 202 is rejected and an error state is reported to the user device 102 that the file server 106 is unavailable for sync.

The synchronization server 104 may act as a load balancer for the file server 106 by spreading the number of sync requests over time, organizing the sync requests by priority or data size or network availability (or other factor), or by otherwise enforcing server policies.

When the server policy is met, the synchronization server 104 may access the notification platform 206 to notify the user device 102 that the file server 106 is available to perform the sync operation (message 208). The notification platform 206 may be provided by various notification services, such as GCM, APNS, MQTT, or other suitable notification mechanisms.

The notification platform 206 transmits a notification 210 the user device 102 indicating that the file server 106 is ready to sync. The user device 102 may then check whether the client policies are still met (operation 212), and if so, a sync operation is conducted (operation 214) between the user device 102 and file server 106.

In an embodiment, the notification platform 206 is incorporated or integrated into the synchronization server 104. In such an embodiment, the synchronization server 104 may transmit the notification to the user device 102 directly.

Figure 3:
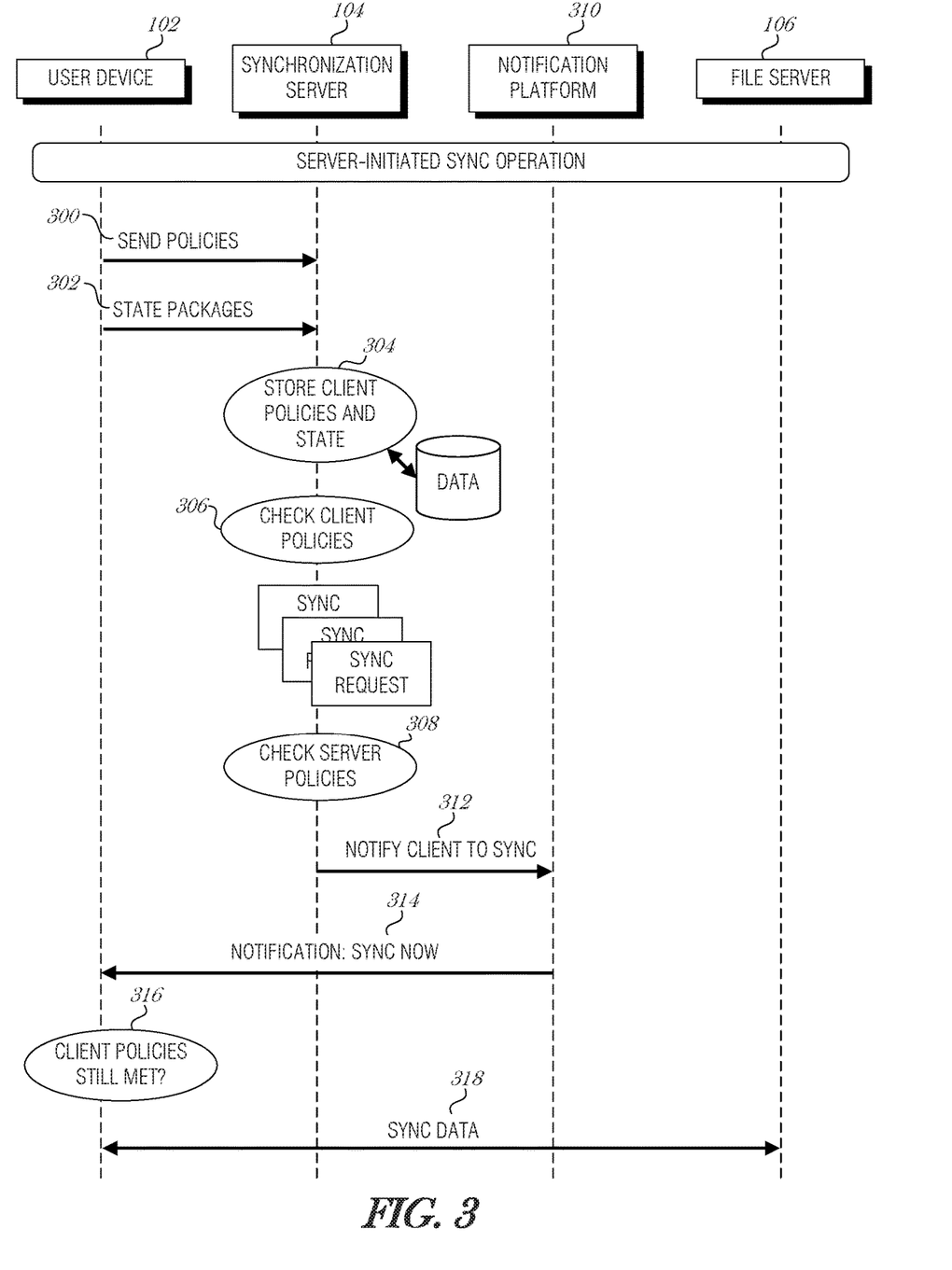
FIG. 3 is a swim lane diagram illustrating message traffic between the user device, synchronization server, and file server, according to an embodiment.

FIG. 3 is a swim lane diagram illustrating message traffic between the user device 102, synchronization server 104, notification platform 310, and file server 106, according to an embodiment. At 300, the user device 102 transmits client-side policies to the synchronization server 104. Example client-side policies include, but are not limited to, whether the user device 102 is connected to a certain type of network, whether the user device 102 is plugged into a power source, whether the user device 102 has a full or nearly full battery, and other aspects of the state of the user device 102 or the state of the operating environment of the user device 102.

The user device 102 may transmit the client-side policies once per sync session, or the user device 102 may transmit the client-side policies at some initial stage (e.g., the first time the user device 102 and synchronization server 104 connect), and then only when there is a change to the client-side policies.

After the client-side policies are sent to the synchronization server 104, either in the current sync session or from a previous sync session, the user device 102 may transmit one or more state packages (operation 302). The state packages provide the synchronization server 104 indication of the state of the user device 102 or the state of an operating environment of the user device 102. Example states include, but are not limited to the time of day, the day of week, the remaining battery available on the user device 102, the type or strength or state of a network connection that the user device 102 has to a wide-area network (e.g., connection to the Internet), whether the user device 102 is plugged into mains power, or the like.

The synchronization server 104 receives the client-side policies and the various state packages from the user device 102 and stores them in a data store (operation 304). The synchronization server 104 monitors the state of the user device 102 and compares it to the client-side policies. When the correct conditions are detected by the synchronization server 104 a sync request is queued (operation 306). The synchronization server 104 then determines whether the server-side policies are met (operation 308). Example server-side policies include, but are not limited to whether the file server 106 has enough network capacity to serve the sync request, whether the file server 106 has more than a threshold number of instances of virtualized servers instantiated, whether the file server 106 has enough data capacity, and the like.

The server policy check may run substantially continuously or periodically, such as every five minutes. A timeout may be used such that if the server does not become available to service a pending sync request in a threshold period of time, then the sync request is removed from the queue and an error state is reported to the user device 102 that the file server 106 is unavailable for sync.

The synchronization server 104 may act as a load balancer for the file server 106 by spreading the number of sync requests over time, organizing the sync requests by priority or data size or network availability (or other factor), or by otherwise enforcing server policies.

When the server policy is met, the synchronization server 104 may access the notification platform 310 to notify the user device 102 that the file server 106 is available to perform the sync operation (notification message 312). The notification platform 310 may be provided by various notification services, such as GCM, APNS, MQTT, or other suitable notification mechanisms.

The notification platform 310 transmits a notification 314 the user device 102 indicating that the file server 106 is ready to sync. The user device 102 may then check whether the client policies are still met (operation 316), and if so, a sync operation is conducted (operation 318) between the user device 102 and file server 106.

In an embodiment, the notification platform 310 is incorporated or integrated into the synchronization server 104. In such an embodiment, the synchronization server 104 may transmit the notification to the user device 102 directly.

Figure 4:
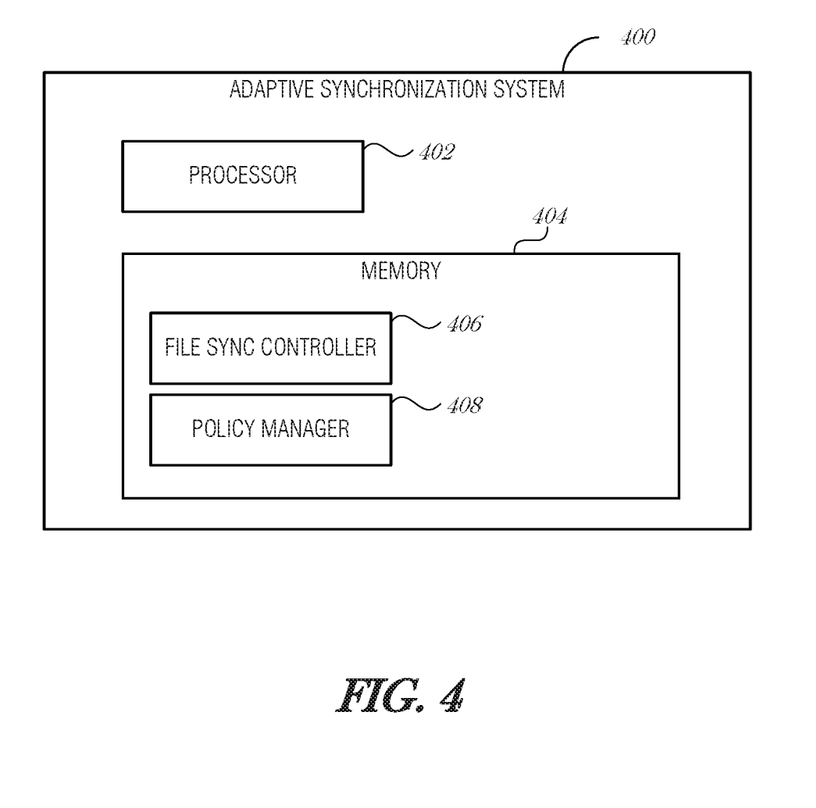
FIG. 4 is a block diagram illustrating a synchronization system for implementing adaptive synching, according to an embodiment.

FIG. 4 is a block diagram illustrating a synchronization system 400 for implementing adaptive synching, according to an embodiment.

The synchronization system 400 includes a processor 402, a memory 404, a file synchronization controller 406, and a policy manager 408.

The processor, memory, file synchronization controller, and policy manager are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entitles may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

In an embodiment, the memory 404 includes instructions, which when executed by the processor 402, cause the processor to implement the file synchronization controller 406 and policy manager 408.

The file synchronization controller 406 may be operable to receive an indication from a client device that the client device wants to synchronize files with a file server. In an embodiment, the indication from the client device includes a sync request message. In a further embodiment, the file synchronization controller 406 is to queue the sync request message with other sync request messages received from other client devices in a sync request queue. In a further embodiment, the file synchronization controller 406 is to evaluate the sync request messages in the sync request queue to identify a next sync request to service.

In another embodiment, the indication from the client device includes a client-side policy for controlling sync operations, and state information of the client device. In a further embodiment, the file synchronization controller 406 is to: receive state information from the client device; monitor the client device based on the state information; and create a sync request and queue the sync request when the state information from the client device indicates that the client device is in conformance with the client-side policy. In a further embodiment, the file synchronization controller 406 is to evaluate the sync request messages in the sync request queue to identify a next sync request to service.

In an embodiment, the client-side policy is a policy from a group of policies including: initiating a sync operation when the client device is plugged into mains power and connected to a Wi-Fi network, or initiating a sync operation after a certain time of day.

The policy manager 408 may be operable to obtain a server-side policy associated with the file server and determine whether the file server is in a state compliant with the server-side policy. In an embodiment, to obtain the server-side policy, the policy manager 408 is to: query the file server for an up-to-date server-side policy; receive the up-to-date server-side policy; and store the up-to-date server-side policy at the synchronization server.

In an embodiment, the server-side policy is a policy from a group of policies including: allowing a sync operation when there are less than a maximum number of connections, allowing a sync operation when there are fewer than a maximum number of server instances, or allowing a sync operation when there is more than a threshold of available network capacity.

The file synchronization controller 408 may be operable to initiate synchronization between the client device and the file server when the file server is in the state compliant with the server-side policy.

In an embodiment, to initiate synchronization, the file synchronization controller 406 is to transmit a message to a notification platform, the notification platform configured to transmit a notification to the client device to trigger the synchronization from the client device. In a further embodiment, the notification platform comprises a service provided by a third party to the synchronization server.

In another embodiment, to initiate synchronization, the file synchronization controller 406 is to transmit a notification to the client device to trigger the synchronization from the client device directly from the synchronization server.

Figure 5:
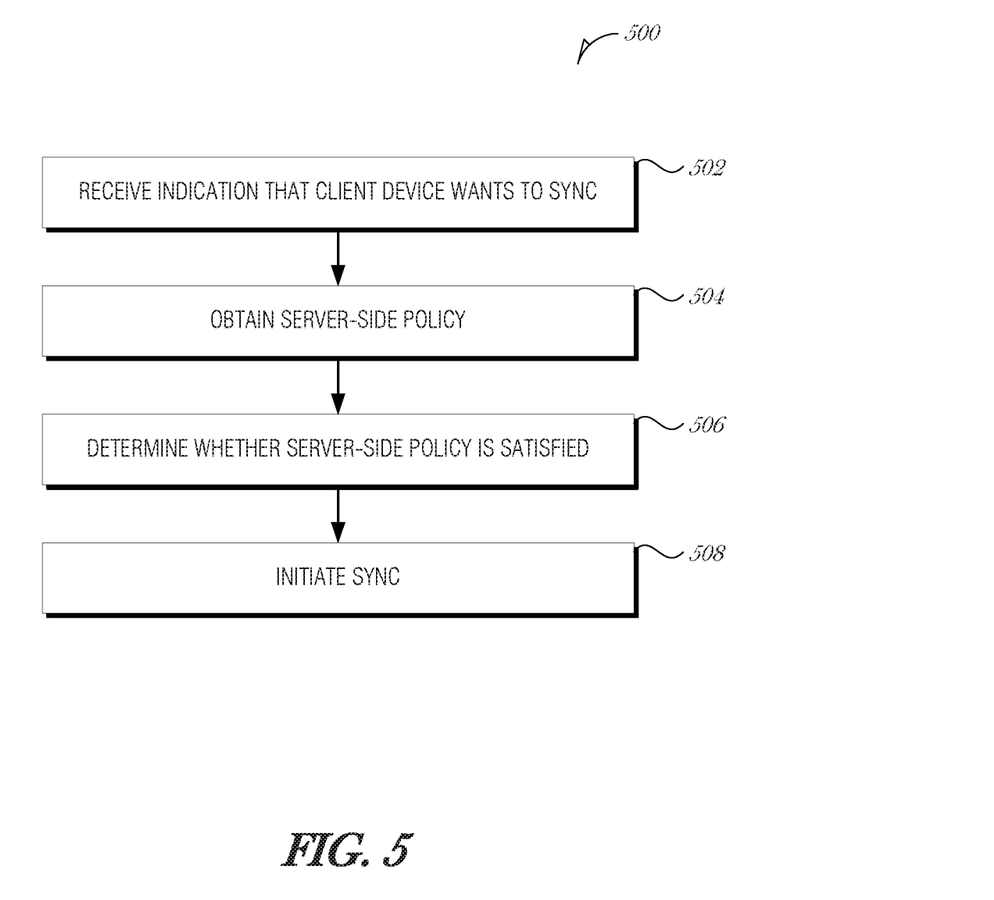
FIG. 5 is a flowchart illustrating a method for implementing adaptive synching, according to an embodiment.

FIG. 5 is a flowchart illustrating a method 500 for implementing adaptive synching, according to an embodiment. At block 502, an indication from a client device that the client device wants to synchronize files with a file server is received at a synchronization server. In an embodiment, the indication from the client device includes a sync request message. In a further embodiment, the method 500 includes queuing the sync request message with other sync request messages received from other client devices in a sync request queue. In a further embodiment, the method 500 includes evaluating the sync request messages in the sync request queue to identify a next sync request to service.

In another embodiment, the indication from the client device includes a client-side policy for controlling sync operations, and state information of the client device. In a further embodiment, the method 500 includes receiving state information from the client device; monitoring the client device based on the state information; and creating a sync request and queuing the sync request when the state information from the client device indicates that the client device is in conformance with the client-side policy. In a further embodiment, the method 500 includes evaluating the sync request messages in the sync request queue to identify a next sync request to service.

In an embodiment, the client-side policy is a policy from a group of policies including: initiating a sync operation when the client device is plugged into mains power and connected to a Wi-Fi network, or initiating a sync operation after a certain time of day.

At block 504, a server-side policy associated with the file server is obtained. In an embodiment, obtaining the server-side policy comprises querying the file server for an up-to-date server-side policy; receiving the up-to-date server-side policy; and storing the up-to-date server-side policy at the synchronization server.

In an embodiment, the server-side policy is a policy from a group of policies including: allowing a sync operation when there are less than a maximum number of connections, allowing a sync operation when there are fewer than a maximum number of server instances, or allowing a sync operation when there is more than a threshold of available network capacity.

At block 506, whether the file server is in a state compliant with the server-side policy is determined. This may be determined by the synchronization server by querying the file server periodically or regularly for a status update. This may also be determined by the synchronization server based on status or state information received at the synchronization server from the file server. Using the state or status information, the synchronization server may evaluate the server-side policies and determine whether the policies are satisfied.

At block 508, a synchronization between the client device and the file server is initiated when the file server is in the state compliant with the server-side policy. In an embodiment, initiating the synchronization comprises transmitting a message to a notification platform, the notification platform configured to transmit a notification to the client device to trigger the synchronization from the client device. In a further embodiment, the notification platform comprises a service provided by a third party to the synchronization server.

In another embodiment, initiating the synchronization comprises transmitting a notification to the client device to trigger the synchronization from the client device directly from the synchronization server.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
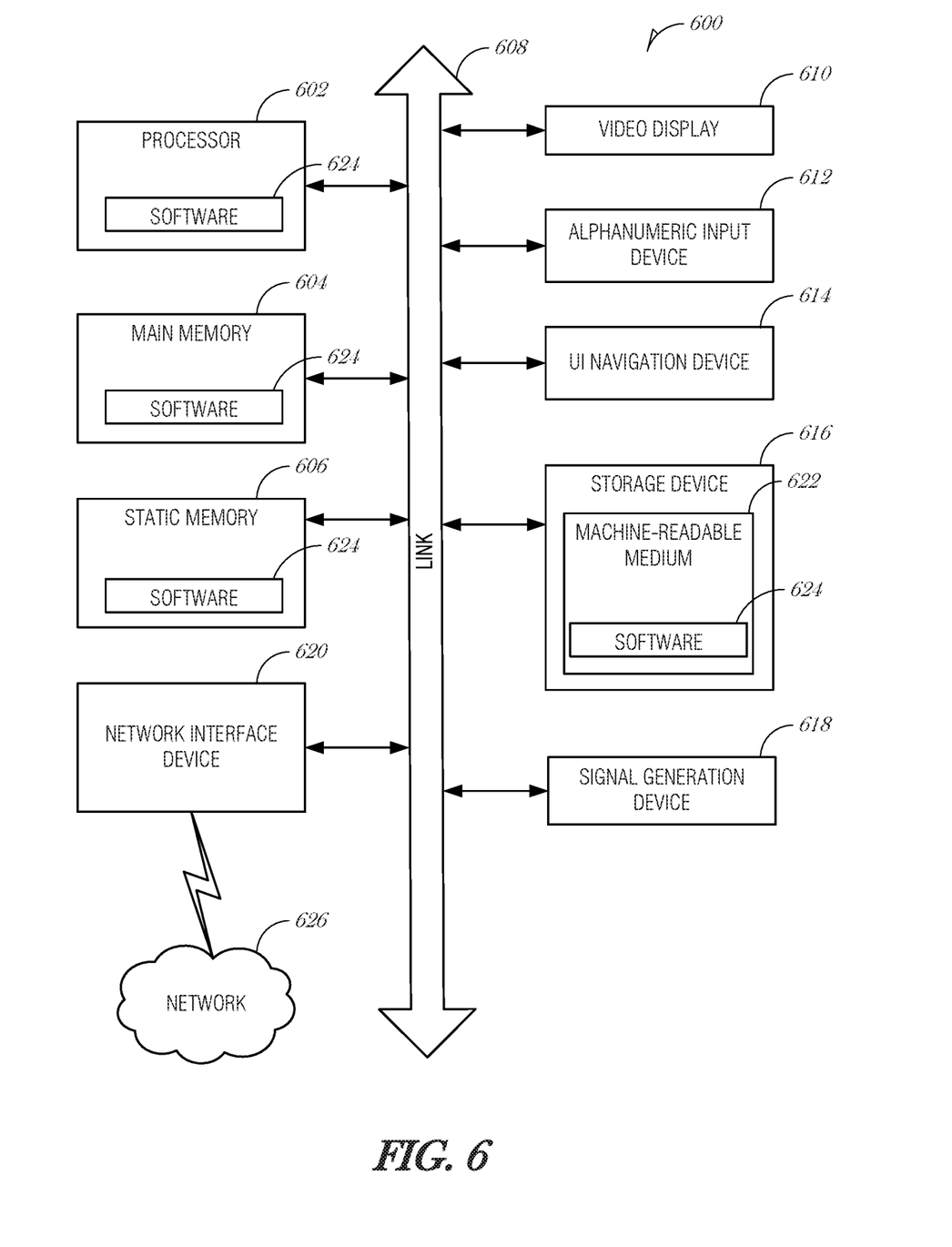
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Figure 7:
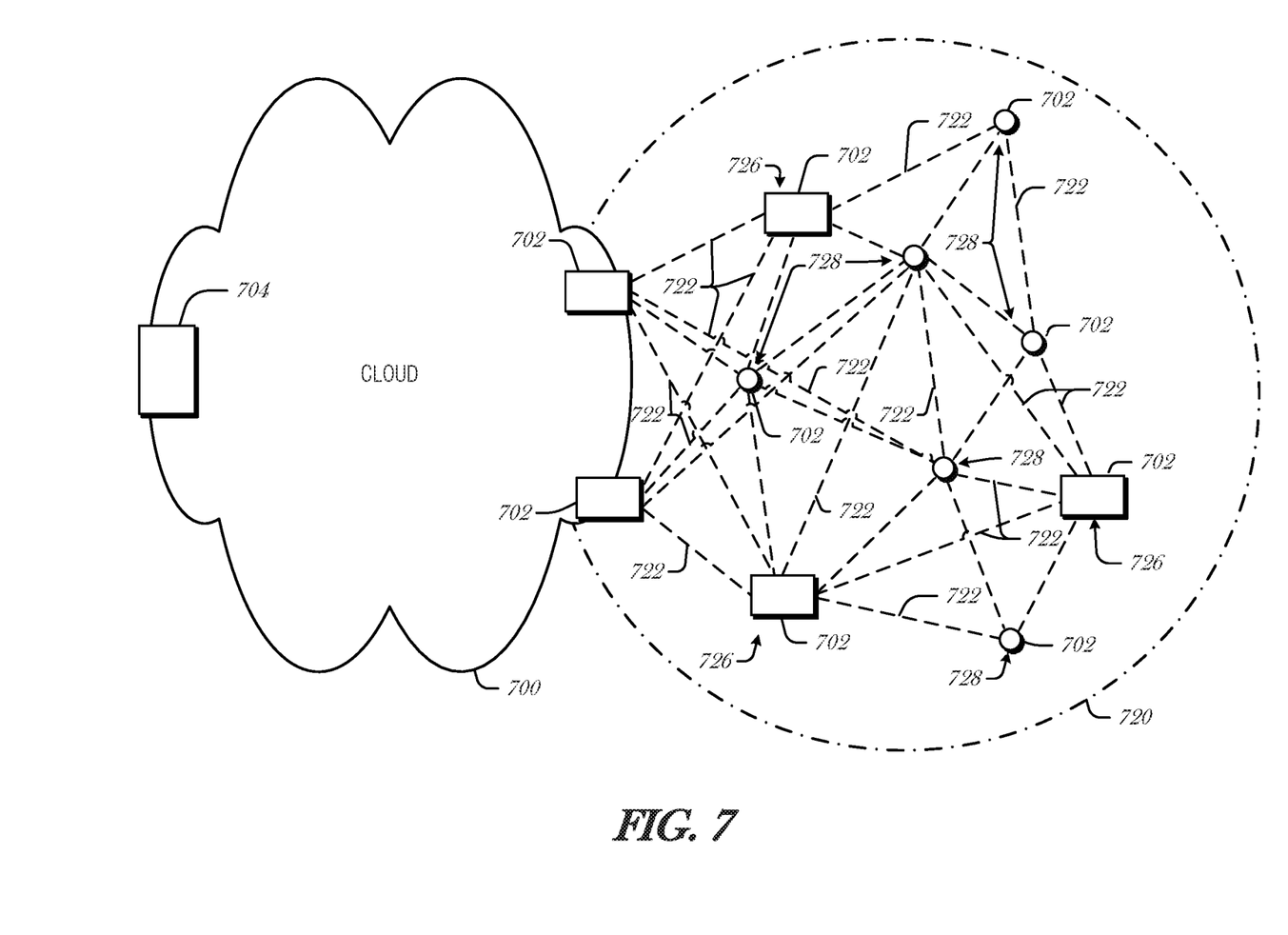
FIG. 7 illustrates a cloud and an IoT mesh network topology, or cloud, according to an embodiment.

FIG. 7 illustrates a cloud and an IoT mesh network topology, or cloud 700, according to an embodiment. The cloud computing network, or cloud 700, is in communication with a mesh network of IoT devices 702, which may be termed a fog 720, operating at the edge of the cloud 700. To simplify the diagram, not every IoT devices 702 is labeled.

The fog 720 may be considered to be a massively interconnected network wherein a number of IoT devices 702 are in communications with each other, for example, by radio links 722. This may be performed using the open interconnect consortium (OIC) standard specification 7.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 702 are shown in this example, gateway/ICDs 724, ICDs 726, and IBDs 728, although any combinations of IoT devices 702 and functionality may be used. The gateway/ICDs 724 may be edge devices that provide communications between the cloud 700 and the fog 720, and may also function as charging and locating devices for the IBDs 728. The ICDs 726 may provide charging for IBDs 728 and may also locate the IBDs 728. The locations, charging alerts, battery alerts, and other data, or both may be passed along to the cloud 700 through the gateway/ICDs 724. As described herein, the IBDs 728 may provide power, location services, or both to other devices or items.

Communications from any IoT device 702 may be passed along the most convenient path between any of the IoT devices 702 to reach the gateways 724. In these networks, the number of interconnections provide substantial redundancy, allowing communications to be maintained, even with the loss of a number of IoT devices 702.

The fog 720 of these IoT devices 702 devices may be presented to devices in the cloud 700, such as a server 704, as a single device located at the edge of the cloud 700, e.g., a fog 720 device. In this example, the alerts coming from the fog 720 may be sent without being identified as coming from a specific IoT device 702 within the fog 720. For example, an alert may indicate that an IBD 728 needs to be returned for charging and the location of the IBD 728, without identifying any specific ICD 726 that sent the alert.

In some examples, the IoT devices 702 may be configured using an imperative programming style, e.g., with each IoT device 702 having a specific function. However, the IoT devices 702 forming the fog 720 device may be configured in a declarative programming style, allowing the IoT devices 702 to reconfigure their operations and determine needed resources in response to conditions, queries, and device failures. For example, a query from a user located at a server 704 about the location of an IBD 728 may result in the fog 720 device selecting the IoT devices 702, such as particular ICDs 726, needed to answer the query. If the IBDs 728 are providing power to a device, sensors associated with the IBD 728, such as power demand, temperature, and the like, may be used in concert with sensors on the device, or other devices, to answer a query. In this example, IoT devices 702 in the fog 720 may select the sensors on particular IBDs 728 based on the query, such as adding data from power sensors or temperature sensors. Further, if some of the IoT devices 702 are not operational, for example, if an ICD 726 has failed, other IoT devices 702 in the fog 720 device may provide substitute, allowing locations to be determined.

In an embodiment, components of a system to perform the operations described herein may be implemented on one or more IoT devices 702 in the fog 720. The IoT devices 702 being synched may be composed of OCF connected edge platforms. Operations may be performed in the fog 702 at the edge of the network.

ADDITIONAL NOTES & EXAMPLES

Example 1 is a synchronization system for implementing adaptive synching, the system comprising: a processor; and a memory including instructions, which when executed by the processor, cause the processor to implement: a file synchronization controller to receive an indication from a client device that the client device wants to synchronize files with a file server; a policy manager to: obtain a server-side policy associated with the file server; and determine whether the file server is in a state compliant with the server-side policy; wherein the file synchronization controller is to initiate synchronization between the client device and the file server when the file server is in the state compliant with the server-side policy.

In Example 2, the subject matter of Example 1 optionally includes wherein the indication from the client device includes a sync request message.

In Example 3, the subject matter of Example 2 optionally includes wherein the file synchronization controller is to queue the sync request message with other sync request messages received from other client devices in a sync request queue.

In Example 4, the subject matter of Example 3 optionally includes wherein the file synchronization controller is to evaluate the sync request messages in the sync request queue to identify a next sync request to service.

In Example 5, the subject matter of any one or more of Examples 1-4 optionally include wherein the indication from the client device includes a client-side policy for controlling sync operations, and state information of the client device.

In Example 6, the subject matter of Example 5 optionally includes wherein the file synchronization controller is to: receive state information from the client device; monitor the client device based on the state information; and create a sync request and queue the sync request when the state information from the client device indicates that the client device is in conformance with the client-side policy.

In Example 7, the subject matter of Example 6 optionally includes wherein the file synchronization controller is to evaluate the sync request messages in the sync request queue to identify a next sync request to service.

In Example 8, the subject matter of any one or more of Examples 5-7 optionally include wherein the client-side policy is a policy from a group of policies including: initiating a sync operation when the client device is plugged into mains power and connected to a Wi-Fi network, or initiating a sync operation after a certain time of day.

In Example 9, the subject matter of any one or more of Examples 1-8 optionally include wherein to obtain the server-side policy, the policy manager is to: query the file server for an up-to-date server-side policy; receive the up-to-date server-side policy; and store the up-to-date server-side policy at the synchronization server.

In Example 10, the subject matter of any one or more of Examples 1-9 optionally include wherein the server-side policy is a policy from a group of policies including: allowing a sync operation when there are less than a maximum number of connections, allowing a sync operation when there are fewer than a maximum number of server instances, or allowing a sync operation when there is more than a threshold of available network capacity.

In Example 11, the subject matter of any one or more of Examples 1-10 optionally include wherein to initiate synchronization, the file synchronization controller is to transmit a message to a notification platform, the notification platform configured to transmit a notification to the client device to trigger the synchronization from the client device.

In Example 12, the subject matter of Example 11 optionally includes wherein the notification platform comprises a service provided by a third party to the synchronization server.

In Example 13, the subject matter of any one or more of Examples 1-12 optionally include wherein to initiate synchronization, the file synchronization controller is to transmit a notification to the client device to trigger the synchronization from the client device directly from the synchronization server.

Example 14 is a method for implementing adaptive synching, the method comprising: receiving, at a synchronization server, an indication from a client device that the client device wants to synchronize files with a file server; obtaining a server-side policy associated with the file server; determining whether the file server is in a state compliant with the server-side policy; and initiating synchronization between the client device and the file server when the file server is in the state compliant with the server-side policy.

In Example 15, the subject matter of Example 14 optionally includes wherein the indication from the client device includes a sync request message.

In Example 16, the subject matter of Example 15 optionally includes queuing the sync request message with other sync request messages received from other client devices in a sync request queue.

In Example 17, the subject matter of Example 16 optionally includes evaluating the sync request messages in the sync request queue to identify a next sync request to service.

In Example 18, the subject matter of any one or more of Examples 14-17 optionally include wherein the indication from the client device includes a client-side policy for controlling sync operations, and state information of the client device.

In Example 19, the subject matter of Example 18 optionally includes receiving state information from the client device; monitoring the client device based on the state information; and creating a sync request and queuing the sync request when the state information from the client device indicates that the client device is in conformance with the client-side policy.

In Example 20, the subject matter of Example 19 optionally includes evaluating the sync request messages in the sync request queue to identify a next sync request to service.

In Example 21, the subject matter of any one or more of Examples 18-20 optionally include wherein the client-side policy is a policy from a group of policies including: initiating a sync operation when the client device is plugged into mains power and connected to a Wi-Fi network, or initiating a sync operation after a certain time of day.

In Example 22, the subject matter of any one or more of Examples 14-21 optionally include wherein obtaining the server-side policy comprises: querying the file server for an up-to-date server-side policy; receiving the up-to-date server-side policy; and storing the up-to-date server-side policy at the synchronization server.

In Example 23, the subject matter of any one or more of Examples 14-22 optionally include wherein the server-side policy is a policy from a group of policies including: allowing a sync operation when there are less than a maximum number of connections, allowing a sync operation when there are fewer than a maximum number of server instances, or allowing a sync operation when there is more than a threshold of available network capacity.

In Example 24, the subject matter of any one or more of Examples 14-23 optionally include wherein initiating synchronization comprises transmitting a message to a notification platform, the notification platform configured to transmit a notification to the client device to trigger the synchronization from the client device.

In Example 25, the subject matter of Example 24 optionally includes wherein the notification platform comprises a service provided by a third party to the synchronization server.

In Example 26, the subject matter of any one or more of Examples 14-25 optionally include wherein initiating synchronization comprises transmitting a notification to the client device to trigger the synchronization from the client device directly from the synchronization server.

Example 27 is at least one machine-readable medium including instructions, which when executed by a machine, cause the machine to perform operations of any of the methods of Examples 14-26.

Example 28 is an apparatus comprising means for performing any of the methods of Examples 14-26.

Example 29 is an apparatus for implementing adaptive synching, the apparatus comprising: means for receiving, at a synchronization server, an indication from a client device that the client device wants to synchronize files with a file server; means for obtaining a server-side policy associated with the file server; means for determining whether the file server is in a state compliant with the server-side policy; and means for initiating synchronization between the client device and the file server when the file server is in the state compliant with the server-side policy.

In Example 30, the subject matter of Example 29 optionally includes wherein the indication from the client device includes a sync request message.

In Example 31, the subject matter of Example 30 optionally includes means for queuing the sync request message with other sync request messages received from other client devices in a sync request queue.

In Example 32, the subject matter of Example 31 optionally includes means for evaluating the sync request messages in the sync request queue to identify a next sync request to service.

In Example 33, the subject matter of any one or more of Examples 29-32 optionally include wherein the indication from the client device includes a client-side policy for controlling sync operations, and state information of the client device.

In Example 34, the subject matter of Example 33 optionally includes means for receiving state information from the client device; means for monitoring the client device based on the state information; and means for creating a sync request and queuing the sync request when the state information from the client device indicates that the client device is in conformance with the client-side policy.

In Example 35, the subject matter of Example 34 optionally includes means for evaluating the sync request messages in the sync request queue to identify a next sync request to service.

In Example 36, the subject matter of any one or more of Examples 33-35 optionally include wherein the client-side policy is a policy from the group of policies including: initiating a sync operation when the client device is plugged into mains power and connected to a Wi-Fi network, or initiating a sync operation after a certain time of day.

In Example 37, the subject matter of any one or more of Examples 29-36 optionally include wherein the means for obtaining the server-side policy comprises: means for querying the file server for an up-to-date server-side policy; means for receiving the up-to-date server-side policy; and means for storing the up-to-date server-side policy at the synchronization server.

In Example 38, the subject matter of any one or more of Examples 29-37 optionally include wherein the server-side policy is a policy from the group of policies including: allowing a sync operation when there are less than a maximum number of connections, allowing a sync operation when there are fewer than a maximum number of server instances, and allowing a sync operation when there is more than a threshold of available network capacity.

In Example 39, the subject matter of any one or more of Examples 29-38 optionally include wherein the means for initiating synchronization comprises means for transmitting a message to a notification platform, the notification platform configured to transmit a notification to the client device to trigger the synchronization from the client device.

In Example 40, the subject matter of Example 39 optionally includes wherein the notification platform comprises a service provided by a third party to the synchronization server.

In Example 41, the subject matter of any one or more of Examples 29-40 optionally include wherein the means for initiating synchronization comprises means for transmitting a notification to the client device to trigger the synchronization from the client device directly from the synchronization server.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described.

However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A synchronization system for implementing adaptive synching, the system comprising:
    a processor; and
    a memory including instructions, which when executed by the processor, cause the processor to implement:
        a file synchronization controller to receive an incite' on from a client device that the client device wants to synchronize files with a file server;
        a policy manager to:
            obtain a server-side policy associated with the file server; and
            determine whether the file server is in a state compliant with the server-side policy;
        wherein the file synchronization controller is to initiate synchronization between the client device and the file server when the file server is in the state compliant with the server-side policy, and wherein to initiate synchronization, the file synchronization controller is to transmit a message to a notification platform, the notification platform configured to transmit a notification to the client device to trigger the synchronization from the client device.

2. The system of claim 1, wherein the indication from the client device includes a sync request message.

3. The system of claim 2, wherein the file synchronization controller is to queue the sync request message with other sync request messages received from other client devices in a sync request queue.

4. The system of claim 3, wherein the file synchronization controller is to evaluate the sync request messages in the sync request queue to identify a next sync request to service.

5. The system of claim 1, wherein the indication from the client device includes a client-side policy for controlling sync operations, and state information of the client device.

6. The system of claim 5, wherein the file synchronization controller is receive state information from the client device;
    monitor the client device based on the state information; and
    create a sync request and queue the sync request when the state information from the client device indicates that the client device is in conformance with the client-side policy.

7. The system of claim 6, wherein the file synchronization controller is to evaluate the sync request messages in the sync request queue to identify a next sync request to service.

8. The system of claim 5, wherein the client-side policy is a policy from a group of policies including:
    initiating a sync operation when the client device is plugged into mains power and connected to a Wi-Fi network, or initiating a sync operation after a certain time of day.

9. The system of claim 1, wherein to obtain the server-side policy, the policy manager is to:
    query the file server for an up-to-date server-side policy;
    receive the up-to-date server-side policy; and
    store the up-to-date server-side policy at the synchronization server.

10. The system of claim 1, wherein the server-side policy is a policy from a group of policies including: allowing a sync operation when there are less than a maximum number of connections, allowing a sync operation when there are fewer than a maximum number of server instances, or allowing a sync operation when there is more than a threshold of available network capacity.

11. The system of claim 1, wherein the notification platform comprises a service provided by a third party to the synchronization server.

12. A method for implementing adaptive synching, the method comprising:
    receiving, at a synchronization server, an indication from a client device that the client device wants to synchronize files with a file server;
    obtaining a server-side policy associated with the file server;
    determining whether the file server is in a state compliant with the server-side policy; and
    initiating synchronization between the client device and the file server when the file server is in the state compliant with the server-side policy, wherein initiating synchronization comprises transmitting a message to a notification platform, the notification platform configured to transmit a notification to the client device to trigger the synchronization from the client device.

13. The method of claim 12, Wherein the indication from the client device includes a sync request message.

14. The method of claim 12, wherein the indication from the client device includes a client-side policy for controlling sync operations, and state information of the client device.

15. The method of claim 14, further comprising:
receiving state information from the client device;
monitoring the client device based on the state information; and
creating a sync request and queuing the sync request when the state information from the client device indicates that, the client device is in conformance with the client-side policy.

16. The method of claim 15, further comprising evaluating the sync request messages in the sync request queue to identify a next sync request to service.

17. The method of claim 14, wherein the client-side policy s a policy from a group of policies including: initiating a sync operation when the client device is plugged into mains power and connected to a Wi-Fi network, or initiating a sync operation after a certain time of day.

18. The method of claim 12, wherein obtaining the server-side policy comprises:
querying the file server for an up-to-date server-side policy;
receiving the up-to-date server-side policy; and
storing the up-to-date server-side policy at the synchronization server.

19. At least one machine-readable medium including instructions for implementing adaptive synching, which when executed by a machine, cause the machine to:
receive, at a synchronization server, an indication from a client device that the client device wants to synchronize files with a file server;
obtain a server-side policy associated with the file server;
determine whether the file server is in a state compliant with the server-side policy; and
initiate synchronization between the client device and the file server when the file server is in the state compliant with the server-side policy, wherein the instructions to initiate synchronization comprise instructions to transmit a message to a notification platform, the notification platform configured to transmit a notification to the client device to trigger the synchronization from the client device.

20. The machine-readable medium of claim 19, wherein the indication from the client device includes a client-side policy for controlling sync operations, and state information of the client device, and wherein the instructions further comprise instructions to:
receive state information from the client device;
monitor the client device based on the state information; and
create a sync request and queuing the sync request when the state information from the client device indicates that the client device is in conformance with the client-side policy.

21. The machine-readable medium of claim 19, wherein the instructions to obtain the server-side policy comprise instructions to:
query the file server for an up-to-date server-side policy;
receive the up-to-date server-side policy; and
store the up-to-date server-side policy at the synchronization server.

* * * * *

UNITED STATES PATENT AND TRADEMARK OFFICE
CERTIFICATE OF CORRECTION

PATENT NO. : 11,106,621 B2  
APPLICATION NO. : 16/305636  
DATED : August 31, 2021  
INVENTOR(S) : Dzung D. Tran Page 1 of 1

It is certified that error appears in the above-identified patent and that said Letters Patent is hereby corrected as shown below:

In the Claims

Column 15, Line 49, Claim 1, delete "incite' on" and insert --indication-- therefor Column 16, Line 12, Claim 6, after "is", insert --to:--

Column 16, Line 12, Claim 6, before "receive", insert a linebreak

Column 16, Line 63, Claim 13, delete "Wherein" and insert --wherein-- therefor

Column 17, Line 7, Claim 15, delete "that," and insert --that-- therefor

Column 17, Line 13, Claim 17, delete "s" and insert --is-- therefor

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*